April 17, 1934. H. W. LEE 1,955,591
LENS
Filed Nov. 11, 1932
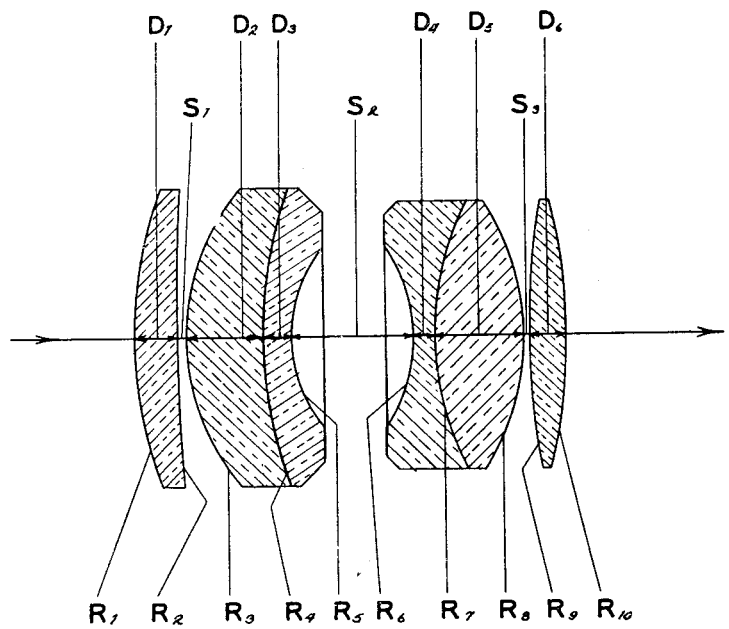
INVENTOR
Horace William Lee
BY
his ATTORNEY Patented Apr. 17, 1934

1,955,591

UNITED STATES PATENT OFFICE 1,955,591

LENS

Horace William Lee, Leicester, England, assignor to Kapella Limited, Leicester, England, a corporation of England Application November 11, 1932, Serial No. 642,193
In Great Britain November 14, 1931

9 Claims. (Cl. 88—57)

This invention relates to improvements in wide aperture lenses, which, while not restricted thereto, are especially adapted for use in motion picture cameras.

Motion picture work requires very high magnification. Thus while the photographic image in the standard 36 mm. motion picture film is only 30 mm. long and in the amateur 16 mm. film are only 12½ mm. long, the pictures projected on the screen are 20 to 100 times as long as such images, sometimes more.

This high magnification requires very sharp definition in the photographic image. For ordinary photographic purposes where only contact prints or enlargements up to 3 and 4 fold are required numerous forms of lenses give quite satisfactory definition. However, most of such forms of lenses have inherent characteristics which prevent them, however skilfully designed and manufactured, from having the high degree of definition desirable for motion picture work.

Further, such forms of lenses as hitherto made as do give high definition have inherent characteristics which make correction for distortion unusually difficult and heretofore unattainable.

The object of the present invention, therefore, is to provide a wide aperture lens being so corrected for spherical and chromatic aberrations, coma, astigmatism, and flatness of field, as to give extremely high definition, and which is also corrected for distortion.

I have found that the type of lens comprising two compound dispersive members, each comprising a collective and a dispersive element, having their exterior concave surfaces facing one another and arranged between two collective members, at least one of which has surfaces of different curvatures with the more strongly curved surfaces facing outwards, the collective elements of the dispersive members being arranged between their respective dispersive elements and the adjacent collective members, can be so constructed as to possess all the above-mentioned desirable features.

Lenses of this general type have been proposed which comply with the following conditions for obtaining good definition, viz:—

(a) constructing the exterior surfaces of the rear dispersive members with curves such that the radius of the concave surface is between 0.30 and 0.35, and the radius of the convex surface is between 0.40 and 0.50 the focal length of the system; and (b) making the thickness of each of the dispersive members between 0.14 and 0.25 the focal length of the system, especially when the field is reduced to 35° to 40°. For motion picture work fields of 50° or more are not required and better definition is obtained by using the above features in lens systems having smaller fields than those previously proposed.

The terms front and rear are used to designate the portions of the lens on the longer and shorter conjugate sides of the lens, respectively.

The above-mentioned features reduce the zonal spherical aberration of high order.

Such previously proposed lenses, however, possess pronounced distortion. I have found, after much research and computation, that this defect can be overcome, or at least greatly reduced, by observing one or, to advantage, both of the following conditions:—

(1) Making the ratio between the radius of curvature of the concave exterior surface of the rear dispersive member and that of the concave exterior surface of the front dispersive member between 1 and 1.25.

(2) The position of the image of the vertex of each surface (of the system) which is formed by all the preceding surfaces beginning with the surface on the longer conjugate side, having been calculated: then the point midway between the images of the first and last vertices of the system must lie between the images of the vertices of the concave surfaces of the dispersive components, and divide the space between them in a ratio, counting such divisions in order from the longer conjugate, not exceeding 3:1.

A further feature of the invention relates to the production of a field free from zonal astigmatism. This advantageous result is obtained by constructing the collective elements of the rear half of the lens system (i. e. the collective element of the rear dispersive member and the rear collective member) of glasses each having a refractive index greater than 1.6200. By this means the Petzval sum is reduced to less than 0.3 and to advantage less than 0.25 and a field is thereby obtained which is free from zonal astigmatism.

In certain cases, e. g. for the improvement of the secondary spectrum, the collective members may be made compound. Where the front collective member, however, is a simple element, it may be made of glass having a lower refractive index than 1.61, this being possible without raising the Petzval sum, since the collective element of the rear dispersive member is formed of glass having a higher refractive index than 1.62. This is of special utility, as such a lens system is always used with this element most exposed, and glasses having a refractive index less than 1.61 are more stable than those having a higher refractive index.

Preferably the refractive index of each of the dispersive elements should not exceed that of the collective element to which it is cemented, by more than 0.02.

Preferably the front collective member is meniscus in form with its exterior surfaces having radii of curvature in ratio exceeding 9:2. Preferably the rear collective member is double convex and its exterior surfaces have radii of curvature in a ratio not exceeding 7:1 or better still 3:1.

The constructional data vary slightly according to the angular field the lens is to embrace, but in all cases the above conditions obtain.

I now give data for the construction of an example suitable for use in a 16 mm. motion picture camera of standard make. The lens system is illustrated in section in the accompanying drawing. The notation is that the successive radii of curvature, counting from the front, are called $R_1$, $R_2$, etc., the sign $+$ denoting that the curve is convex toward the incident light, and $-$ that it is concave toward the same. The axial thicknesses of the elements are denoted by $D_1$, $D_2$, etc., and the separations of the members by $S_1$, $S_2$, etc.

The material is defined in terms of the mean refractive index $n_D$, as conventionally employed, followed by the Abbe V number and by the type number in Messrs. Chance Brothers' Optical Glass Catalogue.

*Equivalent focal length 1". Aperture F/2. Flat field 35°*

| | | $n_D$ | V | Number |
|---|---|---|---|---|
| $R_1 + .766$ | $D_1 = .08$ | 1.6100 | 53.3 | 8894 |
| $R_2 + 3.948$ | $S_1 = .005$ | | | |
| $R_3 + .401$ | $D_2 = .15$ | 1.6150 | 56.1 | 3265 |
| $R_4 + 1.035$ | $D_3 = .044$ | 1.6134 | 36.9 | 4743 |
| $R_5 + .257$ | $S_2 = .22$ | | | |
| $R_6 - .31$ | $D_4 = .045$ | 1.6469 | 33.7 | 337 |
| $R_7 + .50$ | $D_5 = .157$ | 1.6437 | 48.3 | —* |
| $R_8 - .415$ | $S_3 = .005$ | | | |
| $R_9 + 1.4$ | $D_6 = .081$ | 1.6234 | 56.3 | 6665 |
| $R_{10} - 1.01$ | | | | |

* (This glass has been introduced since the publication of Chance's Catalogue).

The Petzval sum of the above system in 0.200.

What is claimed is:

1. A lens system comprising two compound meniscus dispersive members with their concave exterior surfaces facing one another, said members being arranged between two collective members, the dispersive members each comprising a collective element and a dispersive element, the collective elements of the dispersive members being arranged between their respective dispersive elements and the adjacent collective members, one at least of the collective members having exterior surfaces of different curvature, and being arranged with the more strongly curved surfaces facing outwards, the concave exterior surface of the rear dispersive member having a radius between 0.30 and 0.35 the focal length of the system and its convex exterior having a radius between 0.40 and 0.50 such focal length and ratio between the radius of curvature of the concave exterior surface of the rear dispersive member and that of the concave exterior surface of the front dispersive member being between 1 and 1.25, 2. A lens system comprising two compound meniscus dispersive members with their concave exterior surfaces facing one another, said members being arranged between two collective members, the dispersive members each comprising a collective element and a dispersive element, the collective elements of the dispersive members being arranged between their respective dispersive elements and the adjacent collective members, one at least of the collective members having exterior surfaces of different curvature, and being arranged with the more strongly curved surface facing outwards, the concave exterior surface of the rear dispersive member having a radius between 0.30 and 0.35 the focal length of the system and its convex exterior having a radius between 0.40 and 0.50 such focal length, in which the point midway between the images of the first and last vertices of the surfaces of the system, which images are formed by all the preceding surfaces in each instance beginning with the surface on the longer conjugate side, must lie between the images of the vertices of the concave surfaces of the dispersive components, and divide the space between them in a ratio, counting such divisions in order from the longer conjugate, not exceeding 3 : 1.

3. A lens system as in claim 1 in which the point midway between the images of the first and last vertices of the surfaces of the system, which images are formed by all the preceding surfaces in each instance beginning with the surface on the longer conjugate side, must lie between the images of the vertices of the concave surfaces of the dispersive components, and divide the space between them in a ratio, counting such divisions in order from the longer conjugate, not exceeding 3 : 1.

4. A lens system as in claim 1 in which both collective members have surfaces of different curvatures and have their more strongly curved surfaces facing outwards.

5. A lens system as in claim 1 in which the ratio of the curvatures of the exterior surfaces of the front collective member lies between 9 :2 and infinity.

6. A lens system as in claim 1, in which the refractive index of each of the dispersive elements does not exceed that of its associated collective element by more than 0.02.

7. A lens of the type comprising two compound meniscus dispersive members between two collective members, each dispersive member comprising a collective and a dispersive element, in which the collective elements of the dispersive members are between their respective dispersive elements and the adjacent collective members, the exterior surfaces of the dispersive elements are concave and adjacent to one another, and at least one of the collective members has exterior surfaces of unequal curvature, the more strongly curved of such surfaces being turned outwards, the front collective member consisting of a single element having an index of refraction not greater than 1.6100 and the rear collective member consisting of a single element having an index of refraction greater than 1.6200.

8. A lens of the type comprising two compound meniscus dispersive members between two collective members, each dispersive member comprising a collective and a dispersive element, in which the collective elements of the dispersive members are between their respective dispersive elements and the adjacent collective members, the exterior surfaces of the dispersive elements are concave and adjacent to one another, and at least one of the collective members has exterior surfaces of unequal curvature, the more strongly curved of such surfaces being turned outwards, the front collective member consisting of a single element having an index of refraction not greater than 1.6100 and the thickness of each of the dispersive members being more than 0.14 the focal length of the system.

9. A lens of the type claimed in claim 7, in which the thickness of each of the dispersive members is more than 0.14 the focal length of the system.

HORACE WILLIAM LEE.